(12) United States Patent
Barry et al.

(10) Patent No.: US 7,199,195 B2
(45) Date of Patent: Apr. 3, 2007

(54) POLYETHYLENE RESINS

(75) Inventors: David Bruce Barry, Melbourne (AU); Gary M. Diamond, San Jose, CA (US); Hitesh A. Fruitwala, Houston, TX (US); Shih-May Christine Ong, Warren, NJ (US); Chunming Wang, Acton, MA (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 119 days.

(21) Appl. No.: 10/475,601

(22) PCT Filed: Apr. 4, 2002

(86) PCT No.: PCT/US02/10326

§ 371 (c)(1),
(2), (4) Date: May 12, 2004

(87) PCT Pub. No.: WO02/090393

PCT Pub. Date: Nov. 14, 2002

(65) Prior Publication Data

US 2004/0186251 A1    Sep. 23, 2004

Related U.S. Application Data

(60) Provisional application No. 60/289,173, filed on May 7, 2001.

(51) Int. Cl.
    C08F 4/6592    (2006.01)
    C08F 4/653     (2006.01)

(52) U.S. Cl. ................ 526/114; 526/113; 526/118; 526/119; 526/160; 526/124.3; 502/117; 502/152

(58) Field of Classification Search ............ 526/113, 526/114, 118, 119, 160, 124.3
See application file for complete search history.

(56) References Cited

U.S. PATENT DOCUMENTS

| | | | |
|---|---|---|---|
| 4,001,382 A | 1/1977 | Matsumura et al. | |
| 4,173,547 A | 11/1979 | Graff | |
| 4,302,566 A | 11/1981 | Karol et al. | |
| 4,461,783 A | 7/1984 | Yamazaki | 427/39 |
| 4,481,301 A | 11/1984 | Nowlin et al. | |
| 5,525,678 A | 6/1996 | Mink et al. | 525/246 |
| 5,539,076 A | 7/1996 | Nowlin et al. | 526/348.1 |
| 5,624,877 A | 4/1997 | Bergmeister et al. | 502/120 |
| 6,001,766 A | 12/1999 | Kissin et al. | |
| 6,465,586 B2 * | 10/2002 | McDaniel et al. | 526/129 |

FOREIGN PATENT DOCUMENTS

| | | |
|---|---|---|
| EP | 0619325 | 10/1994 |
| EP | 0882744 | 12/1998 |
| EP | 619325 | 8/2001 |
| EP | 882744 | 7/2003 |
| WO | WO 97/27225 * | 7/1997 |
| WO | WO 1998/57998 | 12/1998 |
| WO | WO9857998 | 12/1998 |
| WO | WO 1999/31146 | 6/1999 |
| WO | WO9931146 | 6/1999 |
| WO | WO 2000/50466 | 8/2000 |
| WO | WO0050466 | 8/2000 |
| WO | WO 2001/34661 | 5/2001 |
| WO | WO0134661 | 5/2001 |
| WO | WO 02/090393 | 11/2002 |

OTHER PUBLICATIONS

Brunauer, Stephen et al.; "Adsorption of Gases in Multimolecular Layers," Bureau of Chemistry, vol. 60, pp. 309-319, 1938.
Nowlin, T. E. et al.; "Ziegler-Natta Catalysts on Silica for Ethylene Polymerization," Journal of Polymer Science, vol. 29, pp. 1167-1173, 1991.

* cited by examiner

Primary Examiner—Roberto Rabago

(57) ABSTRACT

The invention provides ethylene/α-olefin copolymers exhibiting improved environmental stress cracking resistance properties, and methods for the production of the copolymers in a single reactor by means of a bimetallic catalyst including a Ziegler component and a metallocene component.

26 Claims, 3 Drawing Sheets

POLYETHYLENE RESINS

CROSS-REFERENCE TO RELATED APPLICATIONS

Figure 1:
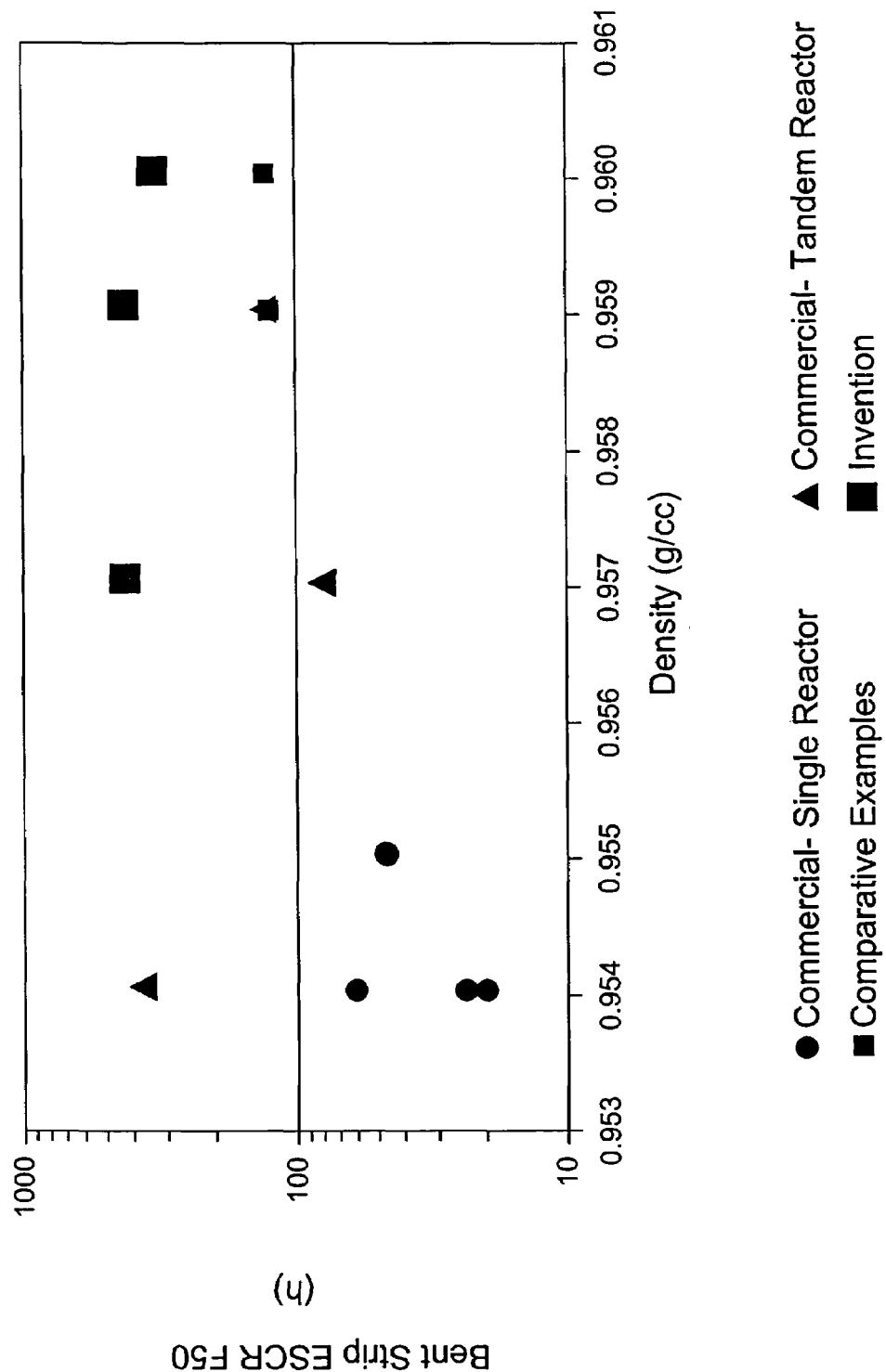

This application is a 371 National Stage Application of International Application No. PCT/US02/10326, filed Apr. 4, 2002, which claims the benefit of U.S. Provisional Application No. 60/289,173, filed on May 7, 2001.

1. FIELD OF THE INVENTION

The invention relates generally to polyethylene resins. In particular, the invention provides ethylene/α-olefin copolymers exhibiting improved environmental stress cracking resistance properties, and methods for the production of the copolymers in a single reactor by means of a bimetallic catalyst including a Ziegler component and a metallocene component.

2. BACKGROUND

Environmental stress cracking is the phenomenon whereby a stressed resin develops brittle cracks when exposed to a fluid such as a detergent or an organic liquid. This phenomenon can cause premature failure of articles manufactured from the resin. Environmental stress cracking resistance ("ESCR") tests have been developed to measure the resistance of resins to their environment. One such test is described in ASTM D1693. ESCR is commercially important particularly when resins come into contact with detergents and organic chemicals, such as household chemical containers and organic chemical containers.

ESCR testing can also be used as a measure of a resin's resistance to slow crack propagation. Slow crack propagation occurs in resins that are at low stress levels, over extended periods of time. In this case a brittle crack propagates through the materials. This type of failure mechanism is seen in commercial applications of polyethylene in pressure pipe, containers, and vessels. Commercial polyethylene pressure pipe systems are designed to have a lifetime in excess of fifty years. Improved ESCR at high stiffness would be particularly desirable for such applications.

It is known in the art that lowering resin density of linear polyethylene resins, such as linear low density polyethylene ("LLDPE"), medium density polyethylene ("MDPE") and high density polyethylene ("HDPE"), greatly improves the ESCR of the resins. However, this improvement in ESCR is at the expense of resin stiffness. As a result; conventional single reactor resins have a poor balance of ESCR and resin stiffness.

Resins with a bimodal molecular weight distribution, also termed "bimodal resins," are resins having at least two polymer components with different average molecular weights. In this description, the resin with the higher average molecular weight is referred to as the "HMW polymer component", and the resin with the lower average molecular weight is referred to as the "LMW polymer component". Resins with a bimodal molecular weight distribution ("MWD") can be produced in a single reactor using the technology disclosed in, for example, U.S. Pat. No. 5,539,076, or by the use of a series of reactors or reaction steps. For example, bimodal MWD polyethylene resins can be produced in a tandem slurry processes. Bimodal resins such as those produced in series reactors are known to have a good combination of high ESCR and stiffness, believed to be because the polymerization process is controlled to ensure that the comonomer is incorporated in the HMW polymer component. U.S. Pat. No. 4,461,783 to Baily et al. discloses that high ESCR, high density resins may be obtained with independently prepared, mechanically blended polyethylene resins of different MWD where the HMW polymer component contains the majority of the comonomer, and the LMW polymer component is essentially a homopolymer.

U.S. Pat. No. 5,539,076 to Nowlin et al. discloses the production of polyethylene resins with bimodal MWD in a single reactor using Ti/Zr bimetallic catalyst systems. However, in these resins, the comonomer is predominantly in the LMW polymer component of the bimodal resin. This type of comonomer distribution does not meet the requirements as disclosed in U.S. Pat. No. 4,461,783 for high ESCR at high resin density. Other background references include WO 00/50466, WO 98/57998, WO 99/31146, U.S. Pat. No. 5,624,877 to Bergmeister et al., EP 0 619 325 A1, and EP 0 882 744 A1.

3. SUMMARY OF THE INVENTION

It has now surprisingly been found that despite the expected unfavorable branching distribution in ethylene/α-olefin copolymers with bimodal MWD produced by bimetallic (e.g., Ti/Zr) catalysts in a single reactor, it is possible to produce such resins which exhibit very high ESCR at high resin density. This unexpected result makes it possible to produce polyethylene resins with a superior balance of density, stiffness, ESCR and fracture toughness, in a single reactor. The ESCR of these resins is better than that of comparable commercial materials with similar resin density, and better than that of resins previously made with bimetallic catalysts, including those described in U.S. Pat. No. 5,539,076.

Accordingly, the present invention generally relates to an ethylene/α-olefin copolymer having a density of at least 0.953 g/cm$^3$ and a Bent Strip ESCR, $T_{50}$, of at least 175 hours, the copolymer prepared in a single reactor. The copolymer generally will have a density of at least 0.955 g/cm$^3$, at least 0.957 g/cm$^3$, at least 0.959 g/cm$^3$ or at least 0.960 g/cm$^3$, with the $T_{50}$ being generally at least 200 hours, at least 250 hours, least 300 hours, at least 350 hours, or at least 400 hours.

The copolymer may have a Melt Flow Rate $I_{21}$, determined according to ASTM D-1238, at 190° C. and 21.6 kg, of at least 20 g/10 min., at least about 22 g/10 min., or at least 24 g/10 min.

According to a further embodiment the copolymer has a Melt Flow Ratio, $I_{21}/I_2$ of at least 100 or at least 120, with the Melt Index, $I_2$, being determined according to ASTM D-1238, at 190° C. and 2.16 kg.

In another aspect, the ethylene/α-olefin copolymer of the present invention has a bimodal molecular weight distribution and includes a HMW polymer component and a LMW polymer component which has a lower average molecular weight (weight average molecular weight, $M_w$, determined by Gel Permeation Chromatography) and a higher density than the HMW polymer component, the copolymer prepared in a single reactor with a polymerization catalyst including a Ziegler component and a metallocene component.

The density of the HMW polymer component generally will range from 0.930 g/cm$^3$ to 0.950 g/cm$^3$. The density of the LMW polymer component can be at least 0.955 g/cm$^3$.

The total density of the copolymer can be at least 0.954 g/cm$^3$.

In another embodiment, the HMW polymer component has a molecular weight distribution, weight average molecular weight/number average molecular weight $M_w/M_n$, of from 3 to 6 and the LMW polymer component has a $M_w/M_n$ of not higher than 6.

It may be particularly advantageous for the weight ratio of HMW polymer component to LMW polymer component to range from 65:35 to 35:65, or from 60:40 to 40:60.

In a further embodiment, the copolymer includes units derived from one or more α-olefins containing 3 to 10 carbon atoms, or 4 to 8 carbon atoms, such as 1-butene, 1-pentene, 4-methyl-1-pentene, 1-hexene or 1-octene.

The copolymer will generally include 0.5 to 20 mol %, or 1 to 10 mol %, of units derived from one or more α-olefins.

A further aspect of the present invention is an ethylene/α-olefin copolymer prepared in a single reactor and having a bimodal MWD and a density of at least 0.953 g/cm³, the copolymer including a HMW polymer component and a LMW polymer component having a lower average molecular weight than the HMW polymer component, the HMW polymer component including at least 30 mol % or at least 35 mol %, of the total α-olefin present in the copolymer.

The present invention also generally relates to a process for making an ethylene/α-olefin copolymer as described above, in a single reactor. The process includes contacting, under polymerization conditions, ethylene, one or more α-olefins, hydrogen and a polymerization catalyst having a Ziegler component and a metallocene component, the combination of Ziegler component and metallocene component being selected to form a copolymer which has a HMW polymer component and a LMW polymer component, the HMW polymer component including at least 30 mol % of the total α-olefin incorporated into the copolymer. In a particular aspect, the copolymer is a copolymer of ethylene and 1-hexene.

The process may advantageously be carried out in a gas phase reactor or in a slurry reactor, although other reactors are also suitable.

In a still further aspect, the present invention relates to a method of improving the ESCR of an ethylene/α-olefin copolymer produced in a single reactor and having a bimodal MWD. According to this method, the comonomers are polymerized in the presence of a polymerization catalyst including a Ziegler component and a metallocene component, which affords a copolymer having a HMW component and a LMW component, the HMW component including at least 30 mol % of the total α-olefin incorporated into the copolymer.

The above copolymers may, for example, be made into blow-molded articles, such as bottles, or into extruded articles, such as pipes.

A still further aspect of the present invention is a polymerization catalyst for the preparation, in a single reactor, of the above-mentioned ethylene/α-olefin copolymers. The catalyst includes a Ziegler component producing the HMW polymer component, and a metallocene component producing the LMW polymer component, the metallocene component including two cyclopentadiene rings which have a total of at least 3 and not more than 8, or al least 4 and not more than 6, substitutions. The substituents can be alkyl groups, particularly those having 1 to 4 carbon atoms, and preferably methyl and/or ethyl groups.

In a particular embodiment, the metallocene is a zirconocene, with the Ziegler component generally including titanium and/or vanadium.

Specific metallocene components include bis(1,3-dialkylcyclopentadienyl)zirconium dichloride or dimethyl, and bis(1,3-dimethylcyclopentadienyl)zirconium dichloride. Specific Ziegler components include both magnesium and titanium.

A still further aspect of the present invention is a supported bimetallic catalyst suitable for use in the production of the ethylene/α-olefin copolymers described herein, the catalyst including a solid support, at least one non-metallocene transition metal source, at least one metallocene compound, and at least one aluminoxane, the at least one metallocene compound including at least one dicyclopentadienyl transition metal compound wherein each of the two cyclopentadienyl rings is independently substituted by up to 4 or up to 5 substituents having not more than 4 carbon atoms, provided that two adjacent substituents on the same ring together with the carbon atoms to which they are bonded may form a 5- or 6-member non-aromatic ring and two substituents on different rings may be replaced by a $C_2$–$C_4$ alkylene or alkylidene group or a silicon-containing group which form a bridge between the rings and further provided that the total number of substituents on the rings does not exceed 6 or alternatively does not exceed 8.

In a particular aspect, the non-metallocene transition metal source includes at least one Group IV or V transition metal, such as titanium, and also includes halogen, such as chlorine.

The support can include comprise silica, although many other support materials are also suitable, such as alumina and silica-alumina.

4. BRIEF DESCRIPTION OF THE DRAWINGS

Figure 2:
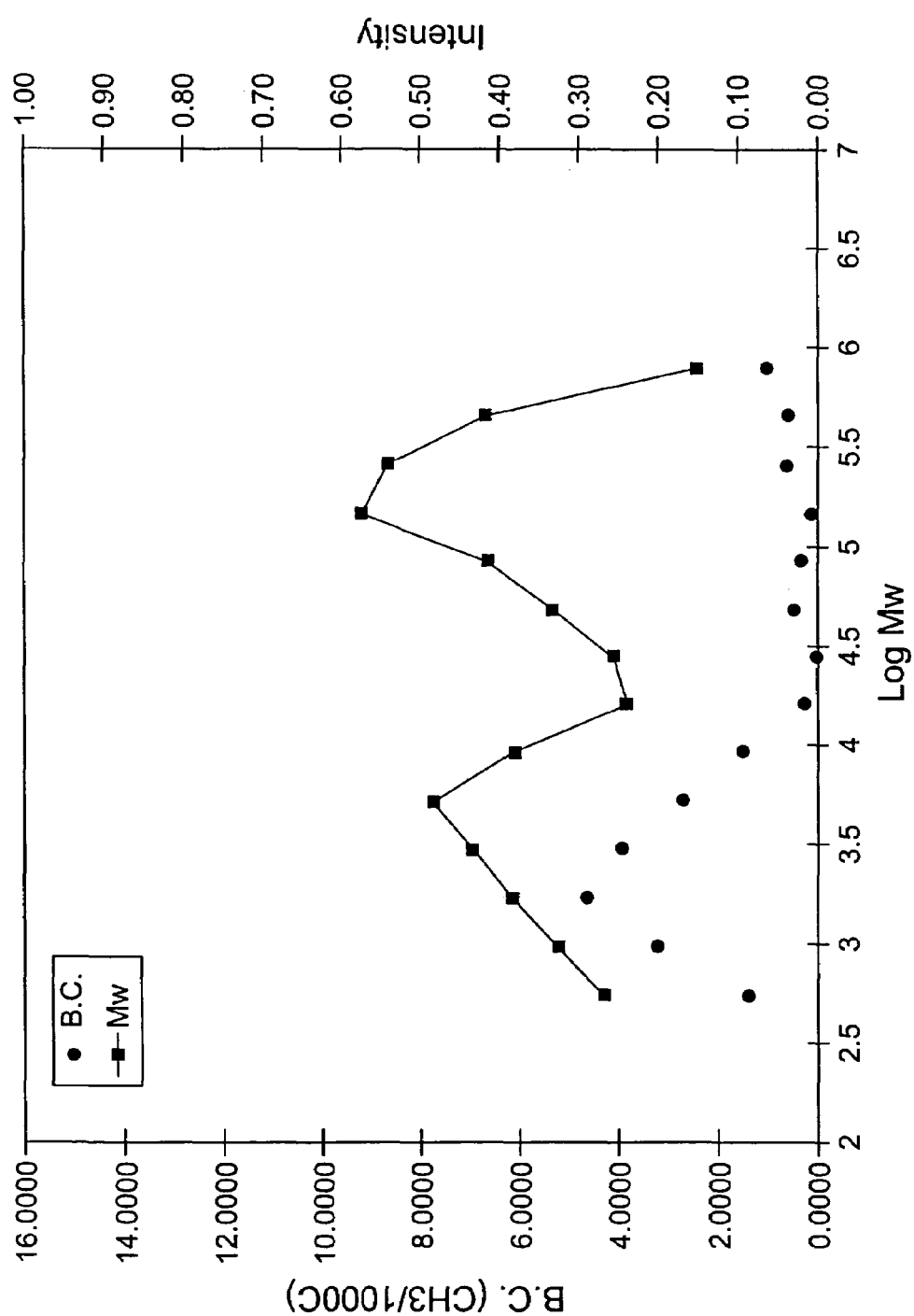
Figure 3:
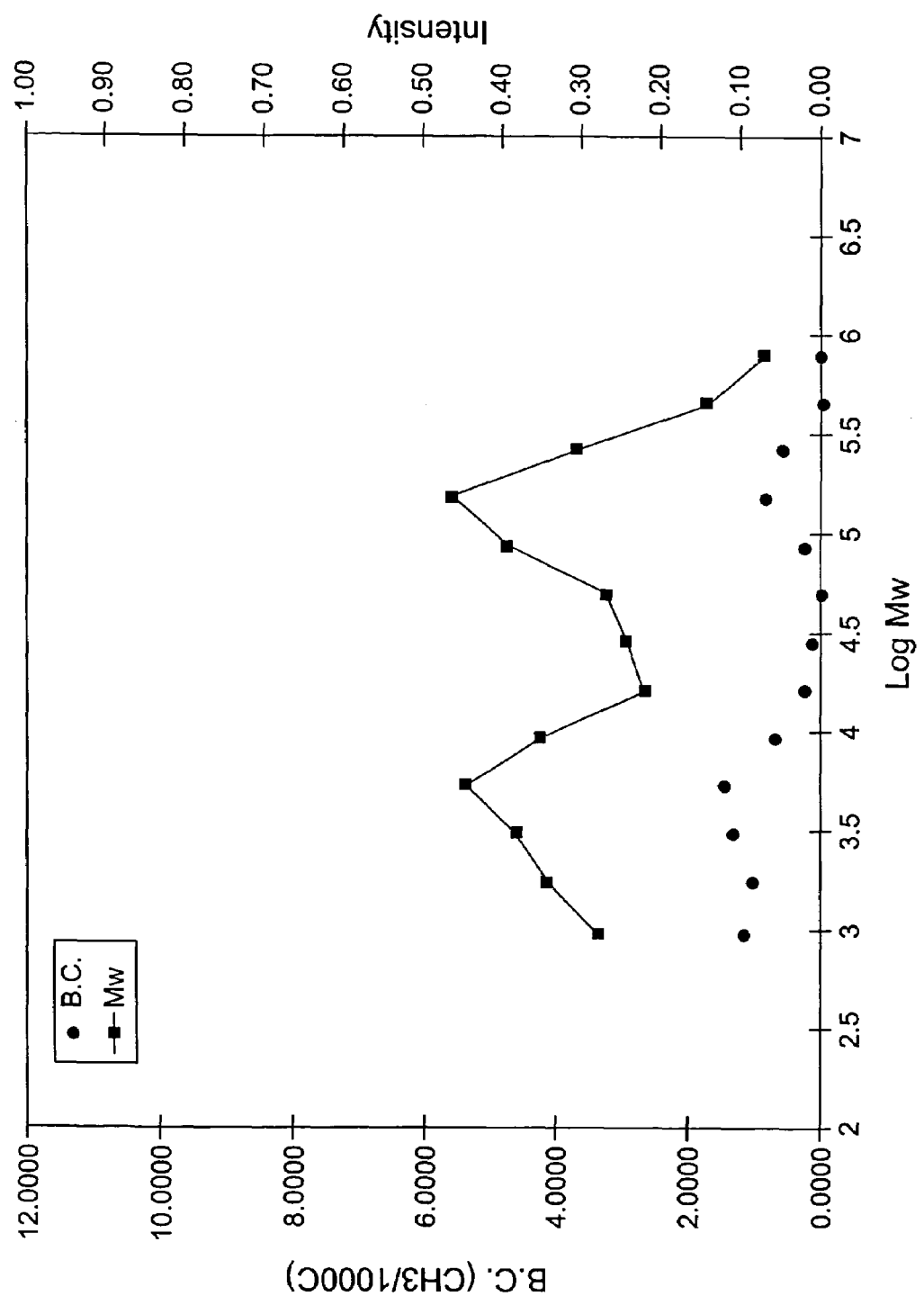

The present invention is further described in the detailed description which follows, in reference to the drawings by way of non-limiting examples of exemplary embodiments. In the drawings:

FIG. 1 shows Density versus Bent Strip ESCR for commercial resins and resins according to the present invention;

FIG. 2 shows Branching Content (B.C.) as a function of Molecular Weight (Mw) for a bimodal MWD resin produced using Ti/Zr bimetallic catalyst technology described in U.S. Pat. No. 5,539,076; and FIG. 3 shows Branching Content (B.C.) as a function of Molecular Weight (Mw) for a bimodal MWD resin produced according to Polymerization Example 1 herein.

5. DETAILED DESCRIPTION

5.1 Catalyst

A preferred synthesis of the bimetallic catalyst for making the copolymers of the present invention includes two stages: synthesis of a supported catalyst intermediate (preferably in the given order), and synthesis of the final supported catalyst. The synthesis is preferably carried out in a series of several consecutive steps under inert conditions in the substantial absence of water and molecular oxygen.

According to a preferred synthesis, support material is first slurried in a non-polar solvent. Support materials for preparing the catalysts of the present invention include solid, particulate, porous materials and may include support materials disclosed in U.S. Pat. No. 4,173,547. Such support materials include, but are not limited to, metal oxides, hydroxides, halides or other metal salts, such as sulfates, carbonates, phosphates, silicates, and combinations thereof, and may be amorphous and/or crystalline. Some preferred support materials include silica, alumina and combinations thereof. Support material particles may have any shape, and are preferably approximately spherical (such as obtainable, for example, by spray-drying).

Preferred support materials include particles, the optimum size of which can easily be established by one of ordinary skill in the art. A support material that is too coarse may lead to unfavorable results, such as low bulk density of the resulting polymer powder. Thus, preferred support materials include particles with average size (diameter) of less than 250 μm, or less than 200 μm, or less than 80 μm. Preferred support materials include particles larger than 0.1 μm, or larger than 10 μm, because smaller silica particles may produce small polymer particles (fines) which can cause reactor instability.

Support material is preferably porous, as porosity increases the surface area of the support material, which, in turn, provides more sites for reaction. The specific surface areas may be measured in accordance with British Standards BS 4359, volume 1 (1969). The specific surface area of support material used in accordance with the present invention is preferably at least 3 m$^2$/g, at least 50 m$^2$/g, at least 150 m$^2$/g, or at least 300 m$^2$/g. There is no preferred upper limit to support material specific surface area. The specific surface area of support material is generally less than 1500 m$^2$/g. The internal porosity of support material may be measured as the ratio of the pore volume and the weight of the material, and can be determined by the BET technique as defined and described by Brunauer et al., *J. Am. Chem. Soc.*, 60, 209–319 (1938). The internal porosity of support material is preferably larger than 0.2 cm$^3$/g, or larger than 0.6 cm$^3$/g. There is no preferred upper limit to support material internal porosity, which, as a practical matter, is limited by particle size and internal pore diameter. Thus, internal porosity is generally less than 2.0 cm$^3$/g.

Preferred support materials for use in the present invention include silica, particularly amorphous silica, such as high surface area amorphous silica. Such support materials are commercially available from a number of sources, and include materials marketed under the tradenames of Davison 952 or Davison 955 by the Davison Chemical Division of W.R.Grace and Company, or Crosfield ES70 by Crosfield Limited (surface area=300 m$^2$/g; pore volume 1.65 cm$^3$/g). The silica is in the form of spherical particles, which are obtained by a spray-drying process. As procured, theses silicas are not calcined (dehydrated).

Because organometallic compounds used in the preparation in the bimetallic catalyst of the present invention may react with water, the support material is preferably substantially dry. Water that is physically bound to the support material can be removed, such as by calcination, prior to forming a bimetallic catalyst according to the present invention.

Preferred calcined support materials include support material that has been calcined at a temperature greater than 100° C., greater than 150° C., greater than 200° C., or greater than 250° C. As sintering of the support material is preferably avoided, calcination is preferably effected at a temperature that is below the sintering temperature of the support material. Calcination of a support material, e.g., silica, is conveniently carried out at a temperature of not higher than 850° C., br not higher than 650° C. Exemplary calcination temperatures are 300° C., 600° C., or 800° C. Total calcination times usually are not shorter than 4 or 6 hours, whereas calcination times longer than 12 hours offer no particular advantage.

Calcination of support material can be performed using any procedure known in the art, and the present invention is not limited by the calcination method. A preferred method of calcination is disclosed in T. E. Nowlin et al., "Ziegler-Natta Catalysts on Silica for Ethylene Polymerization," *J. Polym. Sci., Part A: Polymer Chemistry*, Vol. 29, 1167–1173 (1991).

Support materials used in the Examples herein can be prepared as follows. In a fluidized-bed, silica (such as Davison 955), is heated in steps from ambient temperature to the desired calcining temperature (typically 600° C.). The silica is maintained at this temperature for 4 to 6 hours, then allowed to cool to room temperature. The calcination temperature primarily affects the number of OH groups on the support surface. The number of OH groups on the support surface (silanol groups in the case of silica) is approximately inversely proportional to the temperature of drying or dehydration: the higher the temperature the lower the hydroxyl group content. In other words, at each calcination temperature, the support reaches a particular OH concentration, after which additional heating has no further effect on the OH concentration.

The slurry of the support material in the non-polar solvent is prepared by introducing the support material into the solvent, preferably while stirring, and heating the mixture to 25 to 70° C., preferably to 40 to 60° C. The most suitable non-polar solvents are materials which are liquid at reaction temperatures and in which all of the reactants used later during the catalyst preparation are at least partially soluble. Preferred non-polar solvents are alkanes, particularly those containing 5 to 10 carbon atoms, such as isopentane, hexane, isohexane, n-heptane, isoheptane, octane, nonane, and decane.

Prior to use, the non-polar solvent should be purified to remove traces of water, molecular oxygen, polar compounds, and other materials capable of adversely affecting catalyst activity. The temperature of the slurry before addition of the non-metallocene transition metal compound should not be in excess of 90° C., since otherwise a deactivation of the transition metal component is likely to result. Accordingly, all catalyst synthesis steps are preferably carried out at a temperature below 90° C., more preferably below 80° C.

Following the preparation of a slurry of the support material in a non-polar solvent, the slurry is preferably contacted with an organomagnesium compound.

Preferred organomagnesium compounds for use in the preparation of the present catalyst include dialkylmagnesium compounds of the general formula (I):

$$R^1_m MgR^2_n \qquad (I)$$

where $R^1$ and $R^2$ are the same or different branched or unbranched alkyl groups containing 2 to 12 carbon atoms, preferably 4 to 8 carbon atoms, and m and n are each 0, 1 or 2, provided that the sum (m+n) is equal to the valence of Mg. A particular dialkylmagnesium compound is dibutylmagnesium.

The organomagnesium compound is believed to increase the activity of the catalyst; see, e.g., Nowlin et al., *J. Polym. Sci.: Part A: Polymer Chemistry*, Vol. 29, 1167–1173 (1991). The amount of organomagnesium compound will generally be greater than 0.3 mmol/g, greater than 0.5 mmol/g, or greater than 0.7 mmol/g, where the amount of organomagnesium compound is given as mmol magnesium per gram of support material. In the synthesis of the present catalyst, it is desirable to add no more organomagnesium compound than will be deposited, physically or chemically, into the support, since any excess of the organomagnesium compound in the liquid phase may react with other chemicals used for the catalyst synthesis and precipitate them outside of the support. The drying temperature of the support materials affects the number of sites on the support available for the dialkylmagnesium compound: the higher the drying temperature the lower the number of sites. Thus, the exact ratio of organomagnesium compound to support will vary and should be determined on a case-by-case basis to assure that preferably only so much of the organomagnesium compound is added to the slurry as will be deposited into the support without leaving excess organomagnesium compound in the liquid phase. Thus the ratios given below are intended only as an approximate guideline and the exact amount of organomagnesium compound is to be controlled by the functional limitation discussed above; i.e., it should preferably not be greater than that which can completely be deposited into the support. The appropriate amount of the organomagnesium compound can be determined in any conventional manner, such as by adding the organomagnesium compound to the slurry of the support material until free organomagnesium compound is detected in the liquid phase (for example, by taking a sample of the liquid phase and analyzing it for Mg by one of several analytical procedures known in the art). If organomagnesium compound is added in excess of the amount deposited into the support material, it can be removed by filtration and washing of the support material. However, this is less desirable than the embodiment described above.

For example, for the silica support heated at about 600° C., the amount of the organomagnesium compound added to the slurry will generally be less than 1.7 mmol/g, less than 1.4 mmol/g, or less than about 1.1 mmol/g.

The treatment of the support material with the organomagnesium compound can in principle be carried out at any temperature at which the organomagnesium compound is stable. The contacting of the slurry of the support material in a non-polar solvent with the organomagnesium compound will generally be carried out at a temperature between 20° C. and 80° C. Preferably the addition is carried out at slightly elevated temperature, such as at least 30° C., or at least 40° C. After the addition of the organomagnesium compound is complete, the slurry will usually be stirred, preferably at the temperature of addition, for a sufficient time to allow the organomagnesium compound to react and/or interact with the support material substantially completely. Generally, this time will be not less than 0.1 hours or not less than 0.5 hours, although stirring for more than 2.0 hours will not bring about any significant further reaction/interaction.

Next, the support treated with the organomagnesium compound can be contacted with a modifier compound. As modifier compound, various classes of compounds are suitable, although frequently alcohols such as 1-butanol are used. A further example of a particularly advantageous modifier compound is triethylsilanol. The modifier compound may be used to modify the non-metallocene transition metal of the Ziegler component of the catalyst of the present invention. Because the non-metallocene transition metal Ziegler catalyst component produces the HMW polymer component of the polyethylene resin with a bimodal MWD, the modifier compound has a direct effect on the polymer properties of the HMW polymer component. Different modifier compounds afford different results (to a certain extent) with regard to the weight fraction, the average molecular weight and the MWD of the HMW polymer component. These different properties can readily be established by one skilled in the art.

The amount of modifier compound used is sufficient to react substantially completely with the organomagnesium/ support intermediate material formed after the addition of the organomagnesium compound to the slurried support material. Generally, the molar ratio of organomagnesium compound, such as dialkylmagnesium compound, to modifier compound will be at least 1:5, or at least 1:2, or at least 1:1, and not higher than 15:1, or not higher than 10:1, or not higher than 6:1, or not higher than 2:1.

Regarding the temperature at which the modifier compound is added to the slurry of support material treated with the organomagnesium compound, there are no particular restrictions besides the thermal stability of the materials involved. Generally, the addition will be carried out at a temperature between room temperature (20° C.) and the boiling point of the non-polar solvent of the slurry. As a matter of convenience, the temperature can be about the same as that at which the organomagnesium compound was added and at which the slurry of organomagnesium compound-treated support material was stirred before the addition of the modifier compound, respectively. Following addition of the modifier compound, the slurry will generally be stirred, at about the temperature of addition, for a time period that is sufficient to allow the modifier compound to substantially completely react/interact with the organomagnesium compound-treated support material. The stirring time is generally at least 0.5 hours, or at least 1.0 hour.

After the reaction/interaction with the modifier compound, the resulting slurry of support material is contacted with one or more non-metallocene transition metal compound (source). During this step, the slurry temperature is preferably maintained at 25 to 70° C., particularly 40 to 60° C. As noted above, temperatures in the slurry of 90° C. or greater are likely to result in deactivation of the non-metallocene transition metal source. Suitable transition metal compounds used herein include those of elements of Groups 4 and 5 of the Periodic Table, particularly titanium-containing and vanadium-containing compounds, provided that these compounds are at least somewhat soluble in non-polar solvents. Non-limiting examples of such compounds are titanium and vanadium halides, e.g., titanium tetrachloride, vanadium tetrachloride, vanadium oxytrichloride, and titanium and vanadium alkoxides, wherein the alkoxide moiety has a branched or unbranched alkyl radical of 1 to 20 carbon atoms, preferably 1 to 10 carbon atoms, and even more preferably 1 to 6 carbon atoms, such as methoxy, ethoxy, propoxy, isopropoxy, butoxy, pentoxy and hexoxy. Combinations of these compounds may also be used. The preferred transition metal compounds are titanium-containing compounds, particularly tetravalent titanium-containing compounds, such as $TiCl_4$.

The amount of non-metallocene transition metal compound employed is at least in part determined by the desired ratio of HMW polymer component to LMW polymer component in the ethylene/α-olefin copolymer with a bimodal molecular weight distribution to be produced with the bimetallic catalyst. Because the non-metallocene transition metal (Ziegler) catalyst component will produce the HMW polymer component and the metallocene catalyst component will produce the LMW polymer component, under otherwise identical polymerization conditions the ratio of HMW polymer component to LMW polymer component in the resulting copolymer will increase with increasing molar ratio of non-metallocene transition metal compound to metallocene compound employed for the preparation of the catalyst. The total amount of catalyst components, on the other hand, is limited by the capability of the specific support material used to accommodate the catalyst components. Generally, however, the non-metallocene transition metal is used in an amount that results in an atomic ratio of Mg of the organomagnesium compound (such as a dialkylmagnesium compound used to treat the support) to transition metal(s) in the non-metallocene transition metal compound of at least 0.5:1, or at least 1:1, or at least 1.7:1, and not higher than 5:1, or not higher than 3:1, or not higher than 2:1.

Mixtures of non-metallocene transition metal compounds can also be used, and generally, no restrictions are imposed on the non-metallocene transition metal compounds which can be included. Any non-metallocene transition metal compound that can be used alone can also be used in conjunction with other non-metallocene transition metal compounds.

After addition of the non-metallocene transition metal compound is complete, the slurry solvent is generally removed by evaporation and/or filtration, to obtain a free-flowing powder of a catalyst intermediate.

Next, incorporation of the metallocene compound can be undertaken. The metallocene compound is preferably activated with an aluminoxane.

Preferred metallocene compounds for use in the present invention have the general formula (II):

$$Cp_2MA_2 \qquad (II)$$

wherein M is titanium, zirconium or hafnium; Cp represents mono- or polysubstituted cyclopentadienyl, unsubstituted, mono- or polysubstituted cyclopentadienyl that is part of a (preferably non-aromatic) bicyclic or tricyclic moiety or the cyclopentadienyl moieties may be linked by a bridging group; and A represents halogen atom, hydrogen atom or hydrocarbon group.

In formula (II), the preferred transition metal atom M is zirconium. The substituents on the cyclopentadienyl group, will usually be (preferably straight-chain) alkyl groups having 1 to 6, or 1 to 4 carbon atoms, such as methyl, ethyl, propyl or n-butyl. The cyclopentadienyl group can also be part of an optionally substituted bicyclic or tricyclic moiety such as tetrahydroindenyl or a partially hydrogenated fluorenyl group. The cyclopentadienyl groups can also be bridged, for example, by polymethylene or dialkylsilyl groups, such as —$CH_2$—, —$CH_2$—$CH_2$—, —CR'R"— and —CR'R"—CR'R"—where R' and R" are lower ($C_1$–$C_4$) alkyl groups or hydrogen atoms, —$Si(CH_3)_2$—, —$Si(CH_3)_2$—$CH_2$—$CH_2$—$Si(CH_3)_2$— or similiar bridge groups. If A in formula (II) represents halogen, it represents F, Cl, Br and/or I and is preferably chlorine. If A represents an alkyl group, the alkyl group preferably is a straight-chain or branched alkyl group containing 1 to 8 carbon atoms, such as methyl, ethyl, propyl, isopropyl, n-butyl, isobutyl, n-pentyl, n-hexyl or n-octyl. Of course, the groups Cp may be the same or different, but preferably they are the same. The same applies with respect to the groups A.

The cyclopentadienyl rings are substituted by a total of at least 3, or at least 4 substituents, up to a total of 8 substituents, such as 4 on each ring. Preferably both rings have the same number of substituents. Without wishing to be bound by theory, it is speculated that the steric hindrance between the substituted cyclopentadienyl rings results in a positioning thereof, relative to the catalytic center M, which in comparison to the positioning of two unsubstituted or mono-substituted cyclopentadienyl rings makes it harder for the α-olefin comonomer to reach the catalytic center. This, in turn, reduces the rate at which α-olefin comonomer molecules are incorporated into the copolymer chain, leaving more molecules of α-olefin comonomer(s) for reaction at the other catalytically active center, the non-metallocene transition metal of the Ziegler component. Thereby a more uniform distribution of α-olefin comonomer(s) between the HMW polymer component (produced by the Ziegler catalyst component) and the LMW polymer component (produced by the metallocene catalyst component) can be achieved. If the steric hindrance around the metal of the metallocene catalyst component becomes too great due to excessive substitution of the cyclopentadienyl rings, the catalytic activity of the metallocene component will significantly decrease. This can result in too low an amount and/or too low a molecular weight of the LMW component produced by the metallocene component of the bimetallic catalyst. Factors that determine a suitable upper limit of the total number of substituents (above 3) include, inter alia, the size of the substituents, their relative positions on the ring (e.g., 1,2 or 1,3), the size of the groups A, the size of M and the size of the α-olefin comonomer(s) as well as the activity of the Ziegler catalyst component used in combination with the metallocene component. Based on these considerations, suitable metallocene components for a specific case can readily be determined by one skilled in the art.

Particularly suitable metallocene compounds for use in the preparation of the bimetallic catalyst of the present invention include bis(substituted cyclopentadienyl)metal dihalides, bis(substituted cyclopentadienyl)metal hydridohalides, bis(substituted cyclopentadienyl)metal monoalkyl monohalides, and bis(substituted cyclopentadienyl)metal dialkyls wherein the metal is preferably zirconium or hafnium, the halide groups are preferably chlorine and the alkyl groups (including cycloalkyl groups) preferably have 1 to 6 carbon atoms. Illustrative, non-limiting examples of corresponding metallocenes include:

bis(4,5,6,7-tetrahydroindenyl)zirconium dichloride;
ethylenebis(4,5,6,7-tetrahydroindenyl)zirconium dichloride;
dimethylsilylbis(methylcyclopentadienyl)zirconium dichloride;
dimethylsilylbis(dimethylcyclopentadienyl)zirconium dichloride;
dimethylsilylbis(trimethylcyclopentadienyl)zirconium dichloride;
dimethylsilylbis(4,5,6,7-tetrahydroindenyl)zirconium dichloride;
bis(dimethylcyclopentadienyl)zirconium dibromide;
bis(dimethylcyclopentadienyl)methylzirconium chloride;
bis(dimethylcyclopentadienyl)ethylzirconium chloride;
bis(dimethylcyclopentadienyl)cyclohexylzirconium chloride;
bis(dimethylcyclopentadienyl)phenylzirconium chloride;
bis(dimethylcyclopentadienyl)benzylzirconium chloride;
bis(dimethylcyclopentadienyl)zirconium chloride monohydride;
bis(dimethylcyclopentadienyl)hafnium chloride monohydride;
bis(dimethylcyclopentadienyl)methylzirconium hydride;
bis(dimethylcyclopentadienyl)dimethylzirconium;
bis(dimethylcyclopentadienyl)dimethylhafnium;
bis(dimethylcyclopentadienyl)diphenylzirconium;
bis(dimethylcyclopentadienyl)dibenzylzirconium;
bis(dimethylcyclopentadienyl)methoxyzirconium chloride;
bis(dimethylcyclopentadienyl)ethoxyzirconium chloride;
bis(dimethylcyclopentadienyl)zirconium bis(methanesulfonate);
bis(dimethylcyclopentadienyl)zirconium bis(p-toluenesulfonate);
bis(dimethylcyclopentadienyl)zirconium bis(trifluoromethanesulfonate);
bis(diethylcyclopentadienyl)zirconium dichloride;

bis(dimethylcyclopentadienyl)zirconium dichloride;
bis(trimethylcyclopentadienyl)zirconium dichloride;
bis(tetramethylcyclopentadienyl)zirconium dichloride;
bis(methylethylcyclopentadienyl)zirconium dichloride;
bis(dipropylcyclopentadienyl)zirconium dichloride;
bis(methylpropylcyclopentadienyl)zirconium dichloride;
bis(di-n-butylcyclopentadienyl)zirconium dichloride;
bis(di-n-butylcyclopentadienyl)hafnium dichloride;
bis(methylbutylcyclopentadienyl)zirconium bis(methanesulfonate);
bis(di-trimethylsilylcyclopentadienyl)zirconium dichloride;
bis(di-n-butylcyclopentadienyl)hafnium monochloride monohydride;
bis(di-n-butylcyclopentadienyl)zirconium monochloride monohydride;
bis(dimethylcyclopentadienyl)hafnium dichloride;
bis(dimethylcyclopentadienyl)dimethylhafnium;
bis(di-n-propylcyclopentadienyl)zirconium dichloride;
bis(di-n-propylcyclopentadienyl)zirconium dimethyl;
bis(1,3-methyl-butyl-cyclopentadienyl)zirconium dichloride; and
bis(1,3-methyl-butyl-cyclopentadienyl)zirconium dimethyl Of these, bis(1,3-dimethylcyclopentadienyl)zirconium dichloride and bis(1,3-diethylcyclopentadienyl) zirconium dichloride are preferred metallocene compounds for use in the present invention.

Of course, mixtures of metallocene compounds satisfying the above requirements can also be used. Any metallocene compound that can be used alone can also be used in conjunction with other suitable metallocene compounds. Moreover, the amount of metallocene compound used is such that it results in the desired ratio of HMW polymer component to LMW polymer component in the ethylene/α-olefin copolymer with a bimodal MWD to be produced, the ratio in turn being at least in part determined by the atomic ratio of metal of the non-metallocene transition metal compound to metal of the metallocene, compound. Generally, the atomic ratio is at least 1:1, or at least 2:1, or at least 3:1, or at least 4:1, and not higher than 30:1, or not higher than 15:1, or not higher than 10:1.

Incorporation of the metallocene catalyst component into the carrier can be accomplished in various ways. Incorporation of either or both (a preferably co-employed aluminoxane activator) and the metallocene compound can be into a slurry of catalyst intermediate in a non-polar solvent. The aluminoxane and metallocene compound can be added in any order, or together, such as as solution in an aromatic or the same non-polar solvent, to that slurry or to the isolated catalyst intermediate. A preferred way of combining aluminoxane and metallocene is to add a solution of these two components in an aromatic solvent such as toluene to a slurry of the catalyst intermediate in a different non-polar solvent. This addition is preferably done at room temperature, but higher temperatures can also be used as long as the stability of the various materials present is not affected. Following the addition, the resulting mixture is usually stirred, preferably at room temperature, for sufficient time to allow all of the components to react and/or interact substantially completely with each other. Generally the resulting mixture is stirred for at least 0.5 hours, or at least 1.0 hours. Thereafter, the liquid phase can be evaporated from the slurry to isolate a free-flowing powder containing both non-metallocene and metallocene transition metal components. Filtering is usually avoided to substantially eliminate the loss of catalytic components. If evaporation of the liquid phase under atmospheric pressure would require temperatures that might adversely affect the catalyst components by, for example, degradation, reduced pressure may be used.

Preferably, the catalyst intermediate is first recovered from the slurry in the initially employed non-polar solvent or solvent mixture, such as by filtration and/or distilling the solvent, and is then reslurried in the same or a different non-polar solvent. Non-limiting examples of suitable non-polar solvents for reslurrying of catalyst intermediate include, aliphatic, cycloaliphatic and aromatic hydrocarbons such as those set forth above for use in the preparation of the initial slurry of the support material in a non-polar solvent, e.g., n-pentane, isopentane, n-hexane, methylcyclopentane, isohexanes, cyclohexane, n-heptane, methylcyclohexane, isoheptanes, benzene, toluene, ethylbenzene, xylenes and mixtures of two or more thereof.

Aluminoxanes are preferably employed as activator for the metallocene component of the bimetallic catalyst according to the present invention. Suitable aluminoxanes include, but are not limited to, oligomeric linear and/or cyclic alkylaluminoxanes of the general formula R—(Al(R)—O)$_n$—AlR$_2$ for oligomeric, linear aluminoxanes and (—Al(R)—O—)$_m$ for oligomeric cyclic aluminoxanes, wherein n is 1–40 or 10–20, m is 3–40 or 3–20, and R is a $C_1$–$C_8$ alkyl group, and preferably methyl to provide methylaluminoxane (MAO). MAO is a mixture of oligomers with a very wide distribution of molecular weights and usually with an average molecular weight of about 1200. MAO is typically kept in solution in toluene. It is also possible to use, for the present purpose, aluminoxanes of the type just described wherein the alkyl groups in the above general formulae are different. An example thereof is modified methylaluminoxane (MMAO) wherein in comparison to MAO a part of the methyl groups is replaced by other alkyl groups. Modified methylaluminoxanes are disclosed, for example, in U.S. Pat. No. 6,001,766.

The aluminoxane or mixture of aluminoxanes is employed in an amount which results in sufficient activation of the metallocene transition metal catalyst component of the bimetallic catalyst. Because the metallocene transition metal catalyst component of the bimetallic catalyst produces the LMW polymer component of the ethylene/α-olefin copolymer, under otherwise identical polymerization conditions the weight fraction of LMW polymer component usually increases with increasing amount of aluminoxane employed. Generally, the atomic ratio of Al in the aluminoxane to metal in the metallocene compound is at least 10:1, or at least 50:1, or at least 80:1, and not higher than 1,000:1, or not higher than 500: 1, or not higher than 300:1.

The above catalyst can be used as such (i.e., without any activator or cocatalyst) for the production of the copolymers of the present invention. However, it is preferred to use an additional cocatalyst together therewith. The purpose of the additional cocatalyst is to control the relative activity of the catalyst components, i.e., the amount of polymer product produced by each, of the two catalyst components and thus the ratio of HMW polymer component to LMW polymer component. Consequently, if the latter ratio as afforded by the catalyst without cocatalyst is acceptable for the intended purpose, a cocatalyst need not be used. Generally, however, it is preferred to use the bimetallic catalyst in combination with a cocatalyst that primarily activates the non-metallocene catalyst component to form a catalyst composition suitable for the production of ethylene/α-olefin copolymers with a controlled bimodal molecular weight distribution in a single reactor. Suitable cocatalysts are organometallic compounds of Group 1, 2, 11, 12 or 13 elements, such as aluminum, sodium, lithium, zinc, boron or magnesium, and in general any one or a combination of any of the materials commonly employed to activate Ziegler polymerization catalyst components. Examples thereof are alkyls, hydrides, alkylhydrides and alkylhalides of the mentioned elements, such as n-butyllithium, diethylzinc, di-n-propylzinc and triethylboron. Usually, however, the cocatalyst will be an alkylaluminum compound, preferably a compound of the general formula (III):

$$R^5{}_a AlX_b \tag{III}$$

wherein a is 1, 2 or 3, $R^5$ is a linear or branched alkyl group containing 1 to 10 carbon atoms, X represents hydrogen atom or halogen atom and b is 0, 1 or 2, provided that the sum (a+b) is 3.

Preferred types of compounds of formula (III) are trialkylaluminum, dialkylaluminum hydride, dialkylaluminum halide, alkylaluminum dihydride and alkylaluminum dihalide. The halide preferably is Cl and/or Br. Preferred alkyl groups are linear or branched and contain 1 to 6 carbon atoms, such as methyl, ethyl, propyl, isopropyl, butyl, isobutyl, straight-chain and branched pentyl and hexyl groups. Specific examples of suitable cocatalysts are trimethylaluminum, triethylaluminum, tripropylaluminum, triisopropylaluminum, tributylaluminum, triisobutylaluminum, trihexylaluminum, trioctylaluminum, diisobutylhexylaluminum, isobutyldihexylaluminum, diisobutylaluminum hydride, dihexylaluminum hydride, diethylaluminum chloride, and diisobutylaluminum chloride. A preferred cocatalyst is trimethylaluminum (TMA). Other alkylaluminum compounds, for example those wherein X in formula (III) is alkoxy having 1 to 6 carbon atoms may also be used.

The amount of cocatalyst is sufficient to further activate the non-metallocene transition metal component (Ziegler component) of the catalyst. A suitable amount can be determined by one skilled in the art. If too little cocatalyst is used, the catalyst may not be completely activated, leading to wasted non-metallocene transition metal component of the catalyst and also failing to provide the target ratio of HMW polymer component to LMW polymer component in the copolymer to be produced. Too much cocatalyst, on the other hand, results in wasted cocatalyst, and may even be an unacceptable impurity in the copolymer produced. Generally, the amount of cocatalyst used is based on the amount of ethylene fed to the polymerization process. The amount of cocatalyst generally is at least 5 ppm, or at least 20 ppm, or at least 40 ppm, and not higher than 500 ppm, or not higher than 400 ppm, or not higher than 300 ppm, based on the amount of ethylene used.

5.2 Polymerization

The above-described catalyst or catalyst composition is used to copolymerize ethylene and one or more α-olefins. Examples of suitable α-olefins include propylene, 1-butene, 1-pentene, 1-hexene, 4-methyl-1-pentene, 1-heptene and 1-octene, preferably 1-butene, 1-pentene, 1-hexene or 4-methyl-1-pentene and most preferably 1-hexene. The polymerization may be carried out using any suitable, conventional olefin polymerization process, such as slurry, solution or gas phase polymerization, but preferably it is carried out in a slurry reactor or in a gas phase reactor, particularly a fluidized-bed reactor. The polymerization can be carried out batchwise, semicontinuously or continuously. The reaction is conducted in the substantial absence of catalyst poisons, such as moisture, carbon monoxide and acetylene, with a catalytically effective amount of the catalyst (composition) at temperature and pressure conditions sufficient to initiate the polymerization reaction. Particularly desirable methods for producing the copolymers of the present invention are in a slurry or fluidized bed reactor. Such reactors and processes are described in U.S. Pat. Nos. 4,001,382, 4,302,566, and 4,481,301. The polymer produced in such reactors contains deactivated catalyst particles, because the catalyst is not separated from the polymer.

With the above catalysts, molecular weight of the polymer may be suitably controlled in a known manner, such as by using hydrogen. Hydrogen acts as chain transfer agent. Other reaction conditions being the same, a greater amount of hydrogen results in a lower average molecular weight of the polymer. The molar ratio of hydrogen/ethylene used can vary depending on the desired average molecular weight of the polymer, and can be determined by one skilled in the art for each particular instance. Without limiting the present invention, the amount of hydrogen will generally be between 0 and 2.0 moles of hydrogen per mole of ethylene.

Polymerization temperature and time can be determined by one skilled in the art based on a number of factors, such as the type of polymerization process to be used and the type of polymer to be prepared.

As chemical reactions generally proceed at a greater rate with higher temperature, polymerization temperature should be high enough to obtain an acceptable polymerization rate. In general, therefore, polymerization temperatures are higher than 30° C., more often higher than 75° C., and not so high as to cause deterioration of catalyst or polymer. Specifically, with respect to a fluidized-bed process, the reaction temperature is preferably not so high as to lead to sintering of polymer particles. In general, polymerization temperatures are less than 300° C., or less than 115° C., or less than 105° C.

The polymerization temperature used in the process is in part determined by the density of the ethylene copolymer to be produced. More in particular, the melting point of the resin depends on resin density. The higher the density of the resin, the higher its melting point. The copolymers of the present invention with their relatively high densities are preferably made at a temperature above 80° C., but preferably below 115° C.

When a fluidized-bed reactor is used, one skilled in the art can readily determine appropriate pressures to use. Fluidized-bed reactors can be operated at pressures of up to about 1000 psi (6.9 MPa) or more, and are generally operated at pressures below 350 psi (2.4 MPa). Preferably, fluidized-bed reactors are operated at pressures above 150 psi (1.0 MPa). As is known in the art, operation at higher pressures favors heat transfer because an increase in pressure increases the unit volume heat capacity of the gas.

Once the catalyst is activated, the activated catalyst has a limited lifetime before it becomes deactivated. As is known to those skilled in the art, the half-life of an activated catalyst depends on a number of factors, such as the species of catalyst (and cocatalyst), the presence of impurities such as water and oxygen in the reaction vessel, and other factors. An appropriate length of time for carrying out a polymerization can readily be determined by those skilled in the art for each particular situation.

The density of ethylene copolymers is in part determined by the amount of comonomer in the polymer. The amount of comonomer needed to achieve this result will depend on the particular comonomer being used. Further, the intended comonomers have different reactivity rates, relative to the reactivity rate of ethylene, with respect to the copolymerization thereof with the catalysts of the present invention.

Therefore the amount of comonomer fed to the reactor will also vary depending on the reactivity of the comonomer.

In general, the ethylene/α-olefin copolymers of the present invention are preferably extruded or injection or blow molded into articles or extruded or blown into films. For example, films can be produced which are about 0.2 to 5.0 mils (5–125 μm), preferably 0.5 to 2.0 mils (10–50 μm) in thickness. Blow molded articles include bottles, containers, fuel tanks and drums. The wall thickness of the blow molded articles will usually be in the range from about 0.5 to about 2,000 mils (10–50,000 μm).

The present copolymers may be combined with various additives conventionally added to polymer compositions, such as lubricants, fillers, stabilizers, antioxidants, compatibilizers, pigments, etc. Many additives can be used to stabilize the products. For example, additive packages including hindered phenols, phosphites, antistats and stearates, for addition to resin powders, can be used for pelletization.

6. EXAMPLES

The following Examples further illustrate the essential features of the present invention. However, it will be apparent to those skilled in the art that the specific reactants and reaction conditions used in the Examples do not limit the scope of the present invention.

The properties of the polymers produced in the Examples were determined as follows:

Analysis of the Resin Produced

Prior to testing, the polymers were processed as follows. 1000 ppm each of Irganox™ 1010 (hindered phenol antioxidant) and Irgafos™ 168 (phosphite antioxidant), both produced by CK Witco Corp., and 500 ppm AS900 (antistatic amine agent manufactured by Ciba-Geigy, Switzerland), were dry blended with the granular resin. The mixture was then melt mixed on a Brabender twin screw compounder (¾" screw diameter) at melt temperatures of less than 200° C., with a nitrogen purge to the feed throat.

The Flow Index (FI) or Melt Flow Rate $I_{21}$, g/10 min, at 190° C. was determined as specified in ASTM D 1238 using a load of 21.6 kg.

The density (g/cm$^3$) was determined as specified in ASTM D 1505–68 with the exception that the density measurement was taken after 4 hours instead of after 24 hours of conditioning in the density column.

The molecular weight characterization was performed on a Waters 150C gel permeation chromatograph. The chromatograms were run at 140° C., using trichlorobenzene as the solvent. The Waters 150C determines molecular weight distribution using the technique of molecular size exclusion. This molecular weight data was used to determine the number average molecular weight (Mn), and the weight average molecular weight (Mw).

Environmental stress cracking resistance (ESCR) was determined by forming an article from the resin to be tested. The time to form cracks was then determined in the environment in question. The resins were tested by using the Bent Strip ESCR test. The ESCR of bottles made from the resins was also determined.

The Bent Strip ESCR was determined according to ASTM D1693 condition B as follows. A plaque of the resin was compression molded. Specimens were punched from the plaque. These specimens were notched across their broad face, bent in a controlled manner and held in a 10% Igepal™ solution (aggressive soap) at 50° C. until failure. Multiple specimens were tested and the 50% probability of failure was determined.

The comonomer distribution of the samples was determined by Gel Permeation Chromatography—Fourier Transform IR spectroscopy (GPC-FTIR). The technique of GPC-FTIR for polymer analysis is described in detail in James N. Willis and L. Wheeler, *Applied Spectroscopy*, 50, 3, (1996), the entire disclosure of which is incorporated herein by reference. In this technique, branch (—CH$_3$) content is measured as a function of molecular weight of the resin. A stream from GPC, which separates the polyethylene according to its molecular weight, is diverted to an apparatus called LC-Transform. LC-Transform is an interface between GPC and FTIR. It sprays the GPC stream onto a disc to form a thin layer of polyethylene. This thin layer essentially is a fingerprint of GPC chromatogram and also has the branching information. In order to extract the branching information, this thin layer is then analyzed using the FTIR. Typically the methyl deformation band at 1377 cm$^{-1}$ is used to measure the short chain branching in polyethylene. In order to correct for the path length for the IR beam (thickness of the film deposit), the absorbance at 1368 cm$^{-1}$ was also measured. The ratio of absorbances at 1377 cm$^{-1}$ to 1368 cm$^{-1}$ was used as a normalized measure of the —CH$_3$ content. Also at lower molecular weights (<10,000), one would also have chain ends contributing to the IR absorbance at the above peaks. In order estimate the contribution of chain ends, GPC-FTIR of a low molecular weight homopolymer was also performed. The latter allowed to measure the —CH$_3$ concentration due to the low molecular weight chain ends.

Comparative Catalyst Preparation Example 1

The catalyst was prepared in a two-step process.

STEP 1

Under an inert atmosphere of dry nitrogen, Davison grade 955 silica (367 g), previously calcined at 600° C. under dry nitrogen, and isohexane (3600 mL) were added to a 2 gallon (8 L) glass vessel containing a stirring paddle. The stirring rate was set to 100 rpm, and the temperature of the silica/isohexane slurry was raised to 51–54° C. for the following reagent addition and drying steps. Next, dibutylmagnesium (0.264 mol, 265.3 g of a 2.42 wt % Mg solution in heptane) was added to the stirred silica slurry. After stirring for 2 hours, 1-butanol (0.251 mol, 18.6 g) was added to the stirred reaction mixture. After stirring for another 2 hours, titanium tetrachloride (0.160 mol, 30.3 g) was added to the stirred reaction mixture, and stirring was continued for 2 hours. The liquid phase was then removed by evaporation under nitrogen purge, to yield a free flowing powder.

STEP 2

Formulation: 6.8 mmol MAO/g of Ti component, Al/Zr=120/1

Under an inert atmosphere of dry nitrogen, 374 g of the titanium-containing catalyst component described in Step 1 above, and isopentane (1870 mL) were added to a 2 gallon (8 L) glass vessel containing a stirring paddle. The stirring rate was set to 110 rpm. A solution was prepared by mixing (n-BuCp)$_2$ZrCl$_2$ (bis(n-butylcyclopentadienyl) zirconium dichloride) (21.2 mmol, 8.564 g) and methylaluminoxane (2.546 mmol, 512.7 g of a 13.4 wt % Al solution in toluene) in a stainless steel Hoke bomb at ambient temperature, under an inert atmosphere of dry nitrogen. This solution was then added to the stirred titanium component/isopentane slurry at ambient temperature, over a period of 50 minutes. The temperature of the reaction mixture was raised to 47° C., and the liquid phase was removed by evaporation under nitrogen purge to yield a free flowing brown powder.

Catalyst Preparation Example 1

The catalyst was prepared in a two-step process.
STEP 1
Under an inert atmosphere of dry nitrogen, PQ Corporation grade MS3030 silica (15 g), previously calcined at 700° C. under dry nitrogen, and isohexane (150 mL) were added to a 0.5 L round-bottom flask fitted with a paddle stirrer. The flask was placed in a 50° C. oil bath, and the slurry was stirred vigorously. A solution of DBM (dibutylmagnesium) (10.8 mmol, 9.15 g of a 2.85 wt % Mg solution of DBM in heptane) was further diluted with 15 mL of isohexane, and added to a Schlenk flask containing a magnetic stirring bar. This flask was placed in an oil bath at 50° C. and stirred vigorously. Triethylsilanol (10.2 mmol, 1.35 g of $Et_3SiOH$) was then added dropwise to the stirred DBM solution at 50° C. After stirring at 50° C. for another 15 minutes, the DBM/triethylsilanol reaction mixture was then added dropwise to the stirred silica slurry at 50° C. A solution of titanium tetrachloride (7.5 mmol, 1.4 g) in 10 mL isohexane was added to a Schlenk flask containing a magnetic stirring bar. 1-Pentanol (3.0 mmol, 2.8 mL) was then added dropwise to the stirred $TiCl_4$ solution at ambient temperature, with a nitrogen purge through the vessel to sweep out HCl byproduct. One hour after adding the DBM/triethylsilanol reaction mixture to the stirred silica slurry, the $TiCl_4$/1-pentanol reaction mixture was added dropwise to the silica/DBM/triethysilanol reaction product, which was stirred at 50° C. during the addition, and for a further 1 hour after the addition was complete. The liquid phase was then removed by evaporation under nitrogen purge at 50° C., to yield a free flowing pale brown power.
STEP 2
Under an inert atmosphere of dry nitrogen, 2.5 g of the titanium-containing catalyst component described in Step 1 above, and isohexane (15 mL) were added to a Schlenk flask containing a magnetic stirring bar. The flask was placed in a 50° C. oil bath, and the slurry was stirred vigorously. A solution was prepared by mixing $(1,3-Me_2Cp)_2ZrCl_2$ (bis(1, 3-dimethycyclopentadienyl) zirconium dichloride, 0.41 g) and methylaluminoxane (2.8 g of a 13.4 wt % Al solution in toluene) in a serum bottle at ambient temperature, under an inert atmosphere of dry nitrogen. This solution was then added dropwise to the stirred titanium component/isohexane slurry, which was kept at 50° C. The liquid phase was then removed by evaporation under nitrogen purge at 50° C. to yield a free flowing brown powder.

Catalyst Preparation Example 2

The catalyst was prepared in a two-step process.
Step 1
Under an inert atmosphere of dry nitrogen, Davison grade 955 silica (367 g), previously calcined at 600° C. under dry nitrogen, and isohexane (3600 mL) were added to a 2 gallon (8 L) glass vessel containing a stirring paddle. The stirring rate was set to 100 rpm, and the temperature of the silica/isohexane slurry was raised to 51–54° C. for the following reagent addition and drying steps. Next, dibutylmagnesium (0.264 mol, 265.3 g of a 2.42 wt % Mg solution in heptane) was added to the stirred silica slurry. After stirring for 2 hours, 1-butanol (0.251 mol, 18.6 g) was added to the stirred reaction mixture. After stirring for another 2 hours, titanium tetrachloride (0.160 mol, 30.3 g) was added to the stirred reaction mixture, and stirring was continued for 2 hours. The liquid phase was then removed by evaporation under nitrogen purge, to yield a free flowing powder.
Step 2
Formulation: 6.6 mmol MAO/g of Ti component, Al/Zr=120/1
Under an inert atmosphere of dry nitrogen, 359 g of the titanium-containing catalyst component described in Step 1 above, and isopentane (1860 mL) were added to a 2 gallon (8 L) glass vessel containing a stirring paddle. The stirring rate was set to 100 rpm. A solution was prepared by mixing $(1,3-Me_2Cp)_2ZrCl_2$ (bis(1,3-dimethylcyclopentadienyl) zirconium dichloride) (19.8 mmol, 6.89 g) and methylaluminoxane (2.37 mmol, 471 g of a 13.6 wt % Al solution in toluene) in a stainless steel Hoke bomb at ambient temperature, under an inert atmosphere of dry nitrogen. This solution was then added to the stirred titanium component/isopentane slurry at ambient temperature, over a period of 55 minutes. The temperature of the reaction mixture was raised at 47° C., and the liquid phase was removed by evaporation under nitrogen purge to yield a free flowing brown powder.

Catalyst Preparation Example 3

The catalyst was prepared in a two-step process.

STEP 1

Under an inert atmosphere of dry nitrogen, Crosfield grade ES70 silica (416 g), previously calcined at 600° C. under dry nitrogen, and isopentane (2080 mL) were added to a 2 gallon (8 L)vessel containing a stirring paddle. The stirring rate was set to 150 rpm, and the temperature of the silica/isopentane slurry was raised to 49–57° C. for the following reagent addition and drying steps. Next, dibutylmagnesium (0.298 mol, 258 g of a 2.81 wt % Mg solution in heptane) was added to the stirred silica slurry. After stirring for 2 hours, titanium tetrachloride (0.300 mol, 57.0 g) was added to the stirred reaction mixture, and stirring was continued for 1.5 hours. The liquid phase was then removed by evaporation under nitrogen purge, to yield a free flowing powder.
Step 2
Under an inert atmosphere of dry nitrogen, 375 g of the titanium-containing catalyst component described in Step 1 above, and isopentane (1875 mL) were added to a 2 gallon (8 L) glass vessel containing a stirring paddle. The stirring rate was set to 100 rpm. A solution was prepared by mixing $(1,3-Me_2Cp)_2ZrCl_2$ (bis(1,3-dimethylcyclopentadienyl) zirconium dichloride) (21.9 mmol, 7.62 g) and methylaluminoxane (2.62 mmol, 524 g of a 13.4 wt % Al solution in toluene) in a stainless steel Hoke bomb at ambient temperature, under an inert atmosphere of dry nitrogen. This solution was then added to the stirred titanium component/isopentane slurry at ambient temperature, over a period of 30 minutes. The temperature of the reaction mixture was raised to 48° C., and the liquid phase was removed by evaporation under nitrogen purge to yield a free flowing brown powder.

Comparative Polymerization Example 1

The polymerization was carried out in a gas phase reactor which was run at 100.0° C., 356 psig (2.45 MPa) total reactor pressure, and with the following partial pressures: 162 psi (1.12 MPa) ethylene, 28.0 psi (193 kPa) isopentane, 0.81 psi (5.6 kPa) 1-hexene and 2.4 psi (17 kPa) hydrogen. The molar gas ratios were 0.0050:1 1-hexene:ethylene and 0.0149:1 hydrogen:ethylene with a residence time of 2.67 hr. The cocatalyst trimethylaluminum (TMA) level was 128 ppm by weight and the water addback level was 34 ppm by volume. The ppm values are based on ethylene feed. Catalyst as described in the Comparative Catalyst Preparation Example was fed to the reactor. 140 pounds (64 kg) of resin were collected for sampling.

Polymerization Example 1

A 3.8 L stainless steel autoclave, equipped with a paddle stirrer, and under a slow nitrogen purge at 50° C. with stirring set to 300 rpm, was charged with 1500 mL of dry heptane, 40 µL of water, 4.2 mmol (3.0 mL of a 1.4 Molar solution in heptane) of trimethylaluminum (TMA), and 60 mL of 1-hexene. The reactor was then closed and the stirring speed set for 900 rpm, and the internal temperature was raised to 95° C., then the internal pressure was raised from 10 psi (69 kPa) to 16 psi (110 kPa) by addition of 6 psi (40 kPa) of hydrogen. Ethylene was then introduced into the reactor and the internal pressure was increased to 226 psi (1.56 MPa). Finally, 0.0542 g of the catalyst prepared as described in Catalyst Preparation Example 1 was added to the autoclave. The reactor pressure was maintained at 220–225 psi (1.52–1.55 MPa) for 30 minutes by addition of ethylene, after which time the ethylene flow to the reactor was stopped and the reactor was cooled to room temperature and vented to the atmosphere. The contents of the autoclave were removed, and all solvents were removed from the product by evaporation, to yield 132.5 g of polyethylene resin (ethylene/1-hexene copolymer).

Addition of very small amounts of water to a polymerization reactor containing TMA (or any other alkylaluminum compound) significantly increases the activity of the metallocene catalyst component relative to the non-metallocene catalyst component. This water addition process is commonly referred to as "water addback." Hence, water addback is a method of controlling the weight fractions of the HMW and LMW polymer components. This is an extremely important technique in a commercial reactor to produce the target polyethylene resin. For example, if the product must contain 60% by weight HMW polymer component and 40% by weight LMW polymer component, water addback is normally used to meet this product composition requirement. U.S. Pat. No. 5,525,678 discloses this water addback technique for controlling polymer weight fractions with a bimetallic catalyst.

Polymerization Example 2

A 3.8 L stainless steel autoclave, equipped with a paddle stirrer, and under a slow nitrogen purge at 50° C. with stirring set to 300 rpm, was charged with 1500 mL of dry heptane, 20 µL of water, 2.8 mmol (2.0 mL of a 1.4 molar solution in heptane) of trimethylaluminum (TMA), and 60 mL of 1-hexene. The reactor was then closed and the stirring speed set for 900 rpm, and the internal temperature was raised to 95° C., then the internal pressure was raised from 10 psi (69 kPa) to 16 psi (110 kPa) by addition of 6 psi (40 kPa) of hydrogen. Ethylene was then introduced into the reactor and the internal pressure was increased to 226 psi (1.56 MPa). Finally, 0.0507 g of the catalyst described in Catalyst Preparation Example 2 was added to the autoclave. The reactor pressure was maintained at 220–225 psi (1.52–1.55 MPa) for 30 minutes by addition of ethylene, after which time the ethylene flow to the reactor was stopped and the reactor was cooled to room temperature and vented to the atmosphere. The contents of the autoclave were removed, and all solvents were removed from the product by evaporation, to yield 71.9 g of polyethylene resin (ethylene/1-hexene copolymer).

Polymerization Example 3

A 3.8 L stainless steel autoclave, equipped with a paddle stirrer, and under a slow nitrogen purge at 50° C. with stirring set to 300 rpm, was charged with 1500 mL of dry heptane, 40 µL of water, 4.2 mmol (3.0 mL of a 1.4 molar solution in heptane) of trimethylaluminum (TMA) and 60 mL of 1-hexene. The reactor was then closed and the stirring speed set for 900 rpm, and the internal temperature was raised to 100° C., then the internal pressure was raised from 12 psi (83 kPa) to 20 psi (140 kPa) by addition of 8 psi (6 kPa) of hydrogen. Ethylene was then introduced into the reactor and the internal pressure was increased to 225 psi (1.55 MPa). Finally, 0.0443 g of the catalyst described in Catalyst Preparation Example 3 was added to the autoclave. The reactor pressure was maintained at 220–225 psi (1.52–1.55 Mpa) for 60 minutes by addition of ethylene, after which time the ethylene flow to the reactor was stopped and the reactor was cooled to room temperature and vented to the atmosphere. The contents of the autoclave were removed, and all solvents were removed from the product by evaporation, to yield 80.7 g of polyethylene resin (ethylene/1-hexene copolymer).

Table 1 summarizes some of the properties of the resins prepared according to the Comparative Polymerization Example and Polymerization Examples 1–3. In addition, properties of some commercially available resins (Sample A to G) are also shown.

TABLE 1

| Resin Example No. | Catalyst Prep. Example No. | Reactor Type | Catalyst Type | Melt Flow Rate $I_{21}$ (g/10 min) | Density (g/cm$^3$) | ESCR (hr) |
|---|---|---|---|---|---|---|
| Comp. | Comp. | single | bimetallic | 17 | 0.959 | 125 |
| * | * | single | bimetallic | 26 | 0.960 | 128 |
| 1 | 1 | single | bimetallic | 28 | 0.957 | 454 |
| 2 | 2 | single | bimetallic | 24 | 0.959 | 436 |
| 3 | 3 | single | bimetallic | 32 | 0.960 | 335 |
| A[1] | N/A | single | Cr | 31 | 0.954 | 24 |
| B[2] | N/A | single | Cr | 41 | 0.954 | 21 |
| C[3] | N/A | single | Cr | 22 | 0.955 | 47 |
| D[4] | N/A | single | Cr | 21 | 0.954 | 61 |
| E[5] | N/A | tandem | Ziegler | 31 | 0.959 | 134 |
| F[6] | N/A | tandem | Ziegler | 30 | 0.957 | 80 |
| G[7] | N/A | tandem | Ziegler | 25 | 0.954 | 372 |

*comparative, according to U.S. Pat. No. 5,539,076
[1]Resin HYA 600 available from ExxonMobil Chemical Co.
[2]Resin HYA 301 available from ExxonMobil Chemical Co.
[3]Resin HD5502GA available from BP-AMOCO
[4]Resin 5502 available from Fina
[5]Resin DH 5973 available from PCD
[6]Resin GF 4670 available from Hoechst
[7]Resin BC 80 available from Enichem It is well known that lowering the density of linear polyethylene resins increases the ESCR of the resin (see, e.g., Constant D. R. and Berg B. R., Blow Molding Retec '97, Oct. 1–3, 1997, Industrial Materials Institute, National Research Council, Canada, Conference Proceedings, p. 236). Analysis of the data in Table 1 shows the ESCR performance of the resins of the polymerization examples according to the present invention, is significantly better than that of either commercial single or tandem reactor resins or the single reactor resin made with bimetallic catalyst according to U.S. Pat. No. 5,539,076. Comparing the performance of the commercial resins A–D to E–G shows that tandem resins have a significant advantage over conventional single reactor resins. The ESCR of examples E, F, and G is greater than the ESCR of examples A through D, even though examples E through G have higher densities. Increasing the densities of examples A–D to 0.959 would further lower their ESCR significantly. Commercial tandem grades are known to have a superior ESCR/density balance compared to resins produced using conventional single reactor systems.

Examples E, F, and G and the comparative examples have similar ESCR/density performance. In addition the comparative examples show that the performance of resins produced using the technology given in U.S. Pat. No. 5,539,076 is reproducible, and that the improvements shown in Examples 1, 2, and 3 are not inherent in the technology given in U.S. Pat. No. 5,539,076.

The ESCR performance of the resins of the polymerization examples according to the present invention (Examples 1, 2, and 3) is two to four times better than that of both the commercial tandem and the existing single reactor Ti/Zr resins (examples E and F and comparative examples). This improvement in performance is at similar resin density.

The densities of the resins of Polymerization Examples 1, 2, and 3 according to the present invention are 0.004 to 0.005 units higher than those of the conventional single reactor resins (examples A, B, C and D). Notwithstanding this increase in density, the ESCR performance of the resins of Polymerization Examples 1, 2, and 3 is more than five times better than that of commercial single reactor resins (Examples A to D).

FIG. 1 shows the Density versus Bent Strip ESCR for commercial resins and those according to the present invention. The resins according to the present invention are clearly superior to commercial resins and resins produced according to U.S. Pat. No. 5,539,076 (Comparative Examples).

FIG. 2 is a plot of comonomer distribution (Branching Content, B.C.) as a function of molecular weight (from GPC-FTIR measurements as described above) for bimodal MWD resin produced using the Ti/Zr bimetallic catalyst technology described in U.S. Pat. No. 5,539,076. It is apparent that most of the comonomer (branches) is in the LMW polymer component of the bimodal resin. The HMW polymer component contains only a very low level of comonomer (branches). FIG. 2 shows that bimodal resins produced using the Ti/Zr bimetallic catalyst technology in a single reactor are not expected to meet the requirement disclosed in Bailey et al. for the production of high ESCR PE resins at high density.

FIG. 3 is a plot of comonomer distribution (Branching Content, B.C.) as a function of molecular weight (from GPC-FTIR measurements as described above) for bimodal MWD resin according to the present invention, produced with a catalyst as described in Catalyst Preparation Example 1. It is apparent that the comonomer (branches) is much more evenly distributed between the HMW polymer component and the LMW polymer component than in the bimodal resin of FIG. 2. FIG. 3 shows that bimodal resins produced using the Ti/Zr bimetallic catalyst technology in a single reactor can indeed meet the requirement disclosed in Bailey et al. for the production of high ESCR PE resins at high density.

Certain features of the present invention are described in terms of a set of numerical upper limits and a set of numerical lower limits. It should be appreciated that ranges from any lower limit to any upper limit are within the scope of the invention unless otherwise indicated.

All patents, test procedures, and other documents cited in this application are fully incorporated by reference to the extent such disclosure is not inconsistent with this application and for all jurisdictions in which such incorporation is permitted.

What is claimed is:

1. A process for making an ethylene/α-olefin copolymer having a density of at least 0.953 g/cm$^3$ and a Bent Strip ESCR, $T_{50}$ of at least 175 hours in a single reactor, said process comprising contacting, under polymerization conditions, ethylene, one or more α-olefins, hydrogen and a bimetallic polymerization catalyst comprising a Ziegler component and a metallocene component, the combination of Ziegler component and metallocene component being selected to result in a copolymer having at least a HMW polymer component and at least a LMW polymer component, the HMW polymer component having a higher average molecular weight than the LMW polymer component and comprising at least 30 mol % of the total α-olefin incorporated into the copolymer.

2. The process of claim 1, wherein the one or more α-olefins comprise at least one of 1-butene, 1-pentene, 4-methyl-1-pentene, 1-hexene and 1-octene.

3. The process of claim 1, wherein the copolymer comprises 0.5 to 20 mol % of units derived from one or more α-olefins containing 3 to 10 carbon atoms.

4. The process of claim 3, wherein the copolymer is an ethylene/1-hexene copolymer.

5. The process of claim 2, wherein the metallocene component comprises a biscyclopentadienyl zirconium compound.

6. The process of claim 2, wherein the Ziegler component comprises at least one of titanium and vanadium.

7. The process of claim 6, wherein the metallocene component comprises a bis(dimethylcyclopentadienyl) zirconium compound.

8. The process of claim 1, wherein the process is carried out in a gas phase reactor.

9. The process of claim 1, wherein the process is carried out in a slurry reactor.

10. A process for making an ethylene/α-olefin copolymer having a density of at least 0.953 g/cm$^3$ and a Bent Strip ESCR, $T_{50}$, of at least 175 hours in a single reactor, said process comprising contacting, under polymerization conditions, ethylene, one or more α-olefins, hydrogen and a bimetallic polymerization catalyst comprising a Ziegler component and a metallocene component, the combination of Ziegler component and metallocene component being selected to result in a copolymer having at least a HMW polymer component and at least a LMW polymer component, the HMW polymer component having a higher average molecular weight than the LMW polymer component.

11. The process of claim 10, wherein the one or more α-olefins comprise at least one of 1-butene, 1-pentene, 4-methyl-1-pentene, 1-hexene and 1-octene.

12. The process of claim 10, wherein the copolymer comprises 0.5 to 20 mol % of units derived from one or more αolefins containing 3 to 10 carbon atoms.

13. The process of claim 12, wherein the copolymer is an ethylene/1-hexene copolymer.

14. The process of claim 11, wherein the metallocene component comprises a biscyclopentadienyl zirconium compound.

15. The process of claim 11, wherein the Ziegler component comprises at least one of titanium and vanadium.

16. The process of claim 15, wherein the metallocene component comprises a bis(dimethylcyclopentadienyl) zirconium compound.

17. The process of claim 10, wherein the process is carried out in a gas phase reactor.

18. The process of claim 10, wherein the process is carried out in a slurry reactor.

19. A process for making an ethylene/α-olefin copolymer having a density of at least 0.953 g/cm$^3$ and a Bent Strip ESCR, $T_{50}$, of at least 175 hours in a single reactor, said process comprising contacting, under polymerization conditions, ethylene, one or more α-olefins, hydrogen and a bimetallic polymerization catalyst comprising a Ziegler component and a metallocene component comprising a biscyclopentadienyl zirconium compound, the combination of Ziegler component and metallocene component being selected to result in a copolymer having at least a HMW polymer component and at least a LMW polymer component, the HMW polymer component having a higher average molecular weight than the LMW polymer component.

20. The process of claim 19, wherein the one or more α-olefins comprise 1-hexene.

21. The process of claim 19, wherein the copolymer comprises 0.5 to 20 mol % of units derived from one or more α-olefins containing 3 to 10 carbon atoms.

22. The process of claim 21, wherein the copolymer is an ethylene/1-hexene copolymer.

23. The process of claim 20, wherein the Ziegler component comprises at least one of titanium and vanadium.

24. The process of claim 23, wherein the metallocene component comprises a bis(dimethylcyclopentadienyl) zirconium compound.

25. The process of claim 19, wherein the process is carried out in a gas phase reactor.

26. The process of claim 19, wherein the process is carried out in a slurry reactor.

* * * * *